Jan. 17, 1956 J. A. DOREMUS ET AL 2,731,622
LOCK-OUT SYSTEM
Filed Dec. 26, 1952 2 Sheets-Sheet 1
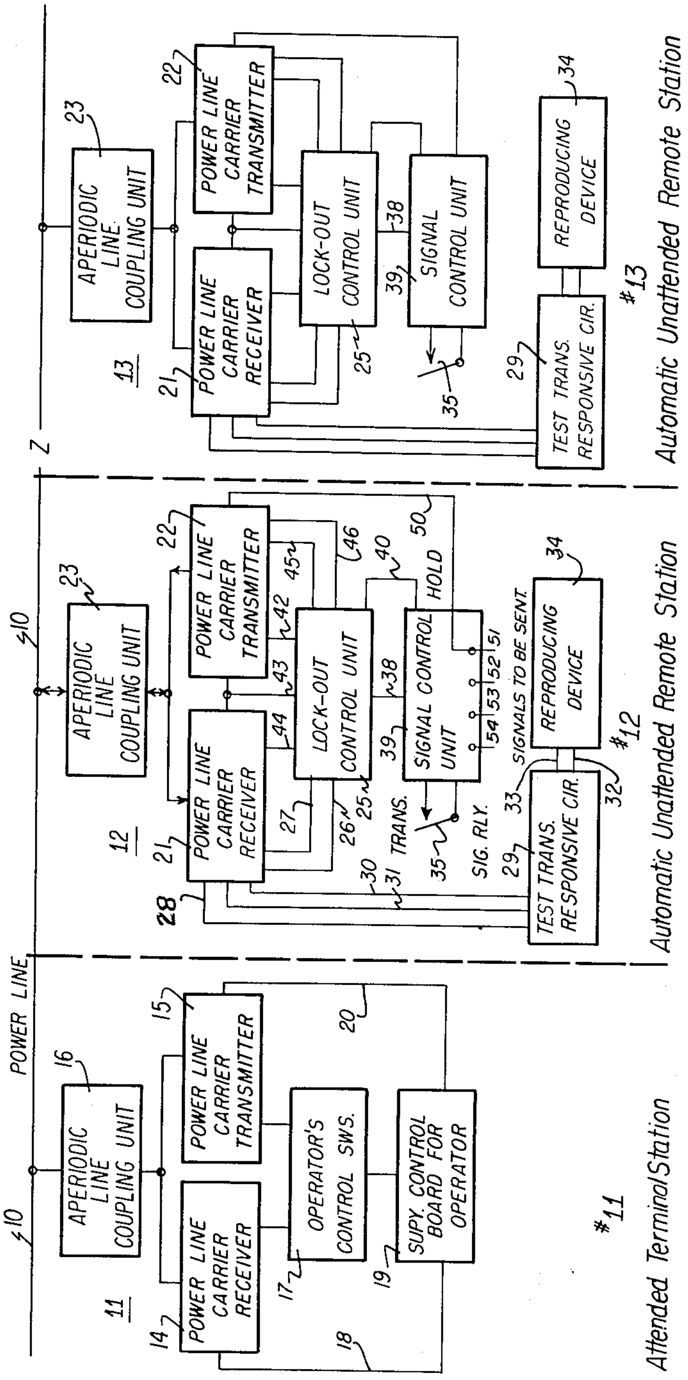
FIG. 1
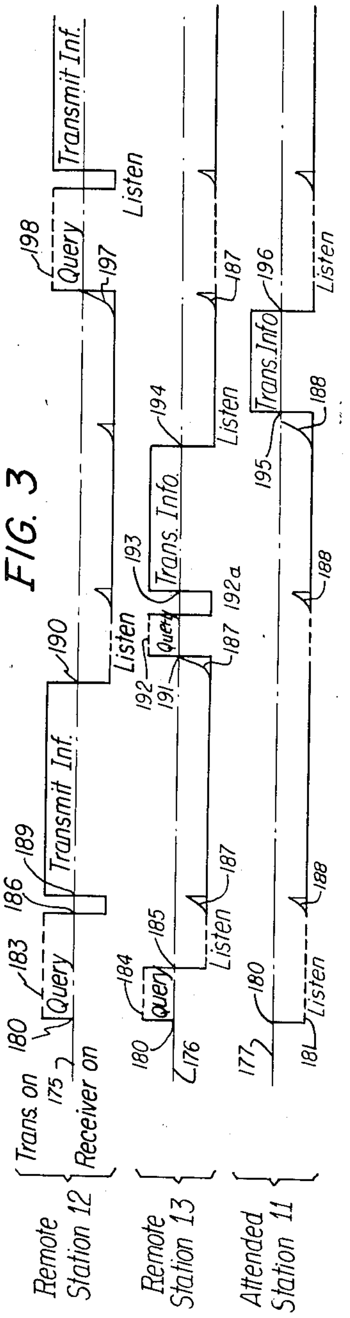
INVENTORS
JOHN A. DOREMUS
CHARLES KEITH STENERSON
HERBERT C. WATERMAN
BY [signature]
ATTY.

INVENTOR.
JOHN A. DOREMUS
CHARLES KEITH STENERSON
HERBERT C. WATERMAN
BY
Foorman L. Mueller
ATTY.

2,731,622

LOCK-OUT SYSTEM

John A. Doremus, Charles Keith Stenerson, and Herbert C. Waterman, Chicago, Ill., assignors to Motorola, Inc., Chicago, Ill., a corporation of Illinois Application December 26, 1952, Serial No. 328,105

14 Claims. (Cl. 340—163)

The present invention relates to communication systems and more particularly to an automatic control circuit for preventing simultaneous transmission of information over the communication system by two or more transmitters in the system.

Communication systems are in common use for transmitting and receiving messages and/or control signals of various types between a terminal station and a plurality of remote automatic unattended stations. Such systems may operate with all carrier line radio transmitters and receivers tuned to the same carrier frequency of operation so that communication can be had between the terminal station and any one of the remote stations over a single channel. Normally, the transmitters are de-energized and the receivers are energized until it is desired to transmit information from any of the stations in the system.

It will be apparent that in such a system there may be times when more than one of the unattended remote stations may want to transmit information at the same time. The simultaneous transmission by two or more such stations will result in objectionable interference, and in the event control signals formed by tones are used, tone heterodyning may take place which either completely disables the communication system or results in the reception of erroneous tone information at the terminal station.

It is an object of the present invention to provide a lockout control circuit for a radio communication system operating on a single channel and having a plurality of automatic stations to prevent the simultaneous transmission of information by two or more transmitters of the system.

Another object of the invention is to provide a control circuit for each automatic unattended station in a radio communication system operating on a single channel which prevents any station from starting to transmit information while another station is transmitting and which operates, in the event that two or more stations start to transmit simultaneously, to enable only one selected station to continue transmitting information.

A further object of the invention is to provide a control circuit operating in the manner referred to in the preceding paragraph in which particular stations are given preferred status so that in the event two stations start to transmit at the same time, a particular one of the two will be permitted to transmit its information first.

A feature of this invention is the provision of a lockout control system for remote unattended stations in a communications system including a first circuit for energizing the transmitter for a preliminary test transmission lasting for a first interval of time and then to energize the receiver to listen for signals from the other transmitters for a second interval of time, and a second circuit for energizing the transmitter to transmit the desired information if no signal is received during the listening interval. One of the intervals may be different for each station in the system so that when a plurality of stations initiate transmissions at the same time, only one station will be permitted to transmit information.

Another feature of this invention is the provision of a system as described in the preceding paragraph wherein each station includes means responsive to a received carrier for disabling the circuits for providing both the preliminary energization of the transmitter and the energization thereof to transmit desired information. This, therefore, prevents the starting of a transmission either for test or for sending information when another transmitter in the system is operating. The means responsive to a received carrier may include a delay unit holding the transmitter energizing circuits inoperative for a period of time after a signal is received greater than the listening period, so that a station cannot try to transmit after receiving a carrier during the test transmission of another station.

A further feature of the invention is the provision of means for coding the test transmissions, together with means responsive to a coded transmission at the receivers, so that the test transmission can be identified and equipment at this station which might respond improperly to simultaneous test transmissions may be disabled.

Further objects, features, and the attending advantages of the invention will be apparent with reference to the following specification and drawings in which:

Fig. 1 is a block diagram of a power line carrier current communication system embodying the lockout control circuit of the invention;

Fig. 3 is a family of curves to show a typical operation of a communication system employing the lockout control circuit of the invention.

Figure 2:
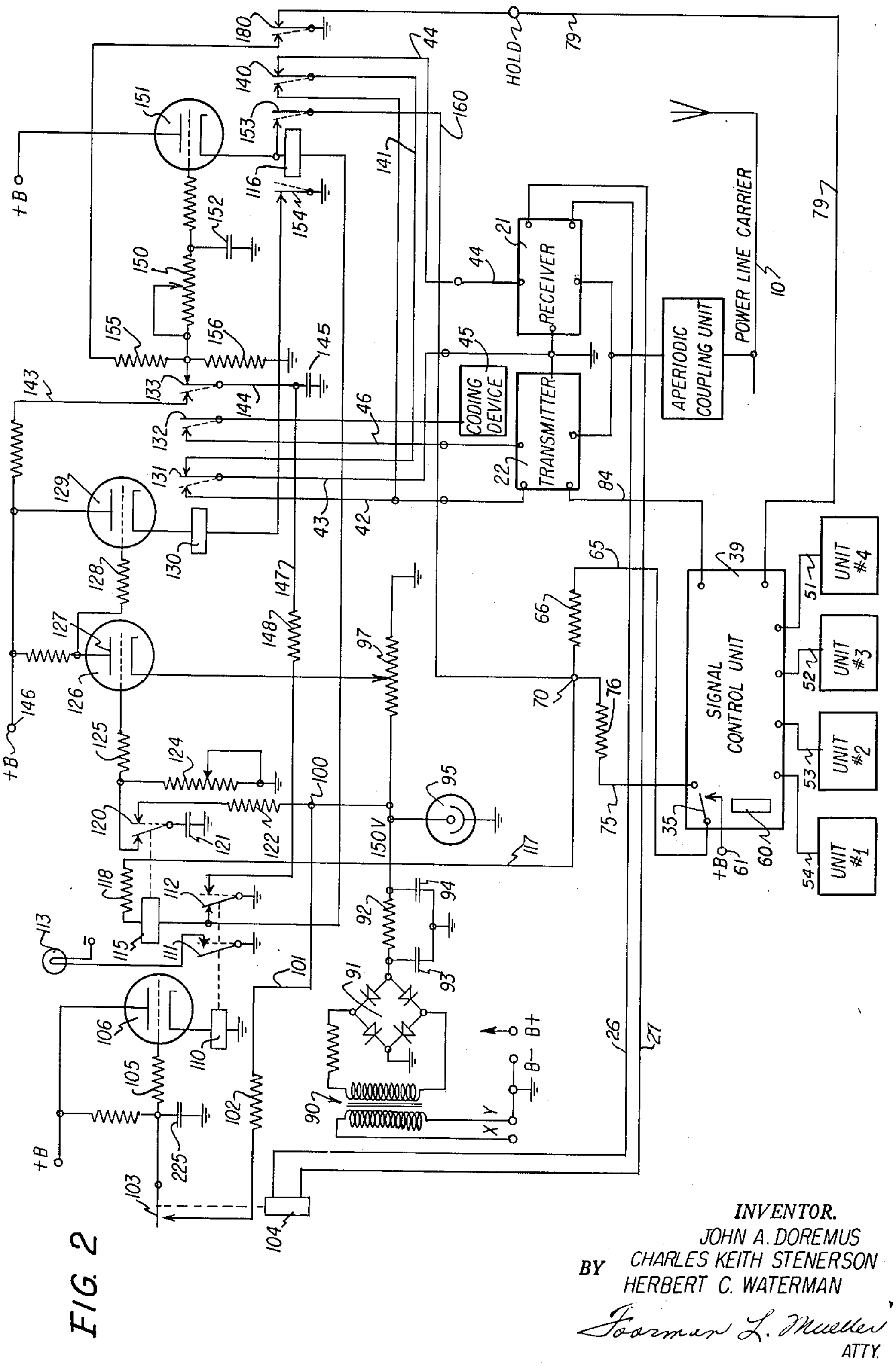
Fig. 2 is a schematic wiring diagram of the lockout control circuit.

In practicing the invention, a power line carrier communication system is provided including remote unattended automatic stations. A lockout control circuit is provided at each remote station including first relay means to preliminarily energize the station transmitter and de-energize the station receiver when it is desired to transmit a signal. The first relay means of the lockout control circuit of each different station is adapted to be energized for different length time periods thus providing an identification signal for each different station. Each control circuit also includes second relay means adapted to be energized only after the first relay means has been energized and de-energized, and following a time delay interval during which the transmitter is de-energized and the receiver energized to provide a listen time. When the second relay means is then energized, the transmitter is again energized and the receiver de-energized to transmit the information so long as a transmit signal is present. The second relay means is subsequently de-energized at the completion of the transmission period when the transmit signal is no longer received. The control circuit further includes third relay means responsive to the reception of a carrier signal to prevent the energization of either said first or second relay means and prevent any operation of the transmitter while a carrier is received indicating that another station transmitter is energized. The third relay means also includes a time delay circuit to prevent its de-energization when a carrier signal is no longer received until after a further period of time greater than the listen time interval. When said first relay means is energized, a circuit may be established to code the output of the station transmitter, and the receivers of the various stations in the system may be provided with circuits responsive to the recption of a coded transmission to operate receiver muting devices and prevent any false system operation or annoyance during the preliminary identifying transmission period.

Reference is now made to Fig. 1 of the drawings in which a power line radio frequency carrier communication system is shown in block outline with the power line indicated at 10, the attended terminal station generally indicated at 11, and two remote automatic unattended stations indicated at 12 and 13. The attended terminal station includes a power line carrier receiver 14 and a power line carrier transmitter 15 connected by the aperiodic line coupling unit 16 to the power line 10. The energization of the receiver 14 or transmitter 15 is arranged to be controlled by the operator's control switches generally indicated at 17 and the signals received by the receiver 14 are connected by line 18 to various reproducing and indicating devices on the operator's supervisory control board 19. Similarly the various signals and information to be transmitted from the control board 19 are connected by the line 20 to the transmitter 15.

The automatic unattended remote stations such as shown at 12 and 13 may be identical, and therefore only the elements of station 12 will now be described in connection with Fig. 1 of the drawings. The remote station includes a power line carrier receiver 21 and a power line carrier transmitter 22 which are connected by the aperiodic line coupling unit 23 to the power line 10. It should be understood that all of the receivers and transmitters in the communication system such as the receivers 14 and 21 and the transmitters 15 and 22 are tuned to the same carrier frequency of operation. According to the invention, a lockout control unit 25 is provided to control the energization and operation of the remote unattended receiver 21 and transmitter 22. A signal control unit 39 is provided which receives signals from various units at the station 12 and provides a response when it is desired to transmit a signal over the system. The unit 39 has memory facilities for holding the signals until transmission thereof is permitted by the lockout control unit 25 and for then applying the signals to the transmitter individually in a sequence. This unit may be in accordance with Doremus and Waterman application Serial No. 221,916, filed April 19, 1951 now Patent No. 2,664,554 issued Dec. 29, 1953.

Normally the receiver 21 is maintained in the energized condition and the transmitter 22 maintained in the de-energized condition by the operation of the lockout control unit 25. With the receiver 21 energized, a carrier signal present on line 10, due to the energization of another transmitter in the system such as the transmitter 15, will provide a signal in lines 26 and 27 to a carrier presence relay in the lockout control unit 25 which causes the lockout control unit to hold the receiver 21 energized and prevent energization of the transmitter 22. Similarly, when a carrier signal is present in line 10 but coded for a test transmission, a signal will be present in line 28 from the power line carrier receiver 21 to also energize the test transmission responsive circuit 29 and prevent passage of output signals from the receiver 21 in lines 30 and 31 to lines 32 and 33 and the reproducing device 34. Thus when a coded carrier signal is present in line 10, the output circuit of the receiver 21 in each of the automatic unattended remote stations, and the receiver 14 in the attended terminal station, will be muted to prevent reproduction of such signal by reproducing device 34. As previously mentioned a coded carrier signal is produced in response to the operation of the lockout control unit 25 during the preliminary identifying transmission period of the station transmitter desiring to transmit.

When the transmission sequence is initiated from the automatc unattended remote station 12 by the signal control unit 39, the switch 35 is closed to establish a circuit for applying a transmit potential to the lockout control unit 25 through line 38 from the signal control unit 39. With a transmitting potential present on line 38, and providing the carrier presence relay in the lockout control unit 25 is not energized by a signal in lines 26 and 27 from the receiver 21, the receiver 21 will be de-energized and the transmitter 22 energized through lines 42 and 43, the receiver 21 having previously been energized through lines 43 and 44. The lockout control unit 25 is effective to maintain the preliminary energization of the transmitter 22 for a short period of time, which period of time may be different for every automatic unattended remote station such as stations 12 and 13 in the communication system. During the preliminary energization period of the transmitter 22, a signal is supplied to lines 45 and 46 from the lockout control unit 25 to transmitter 22, to code the carrier frequency of the transmitter in order to operate the receiver muting devices of the other stations in the system during the preliminary transmission interval. At the end of the preliminary transmission interval, the transmitter 22 is again de-energized and the receiver 21 energized for a short period of time which may be termed a listen interval. During the listen interval, if a carrier signal from the power line 10 is received by the receiver 21, the signal will be connected across lines 26 and 27 to the lockout control unit 25 to prevent the subsequent energization of the transmitter 22 in response to the transmit potential in line 38 for transmitting the information from the signal control unit 39 through line 50 to the transmitter 22 and power line 10. If, at the end of the listen interval, no other carrier signal is received by the receiver 21 and therefore no carrier present signal is connected in lines 26 and 27, the lockout control unit 25 will again energize the transmitter 22 and de-energize the receiver 21 to permit transmission of the signal from the signal control unit 39 through line 50. In the subsequent final energization of the transmitter 22, no signal is connected to lines 45 and 46 from the lockout control unit 25 to code the carrier frequency of the transmitter 22 and therefore the receivers of the other stations in the system will reproduce the information transmitted by the transmitter 22. At the same time that the transmitter 22 is finally energized by the lockout control unit 25, the holding circuit in line 40 is de-energized and the signal control unit 39 is rendered operative to apply the various signals to be transmitted to the transmitter 22 through line 50. After the signal control unit 39 has sent its modulating signals to the transmitter 22, and assuming the initial transmitting signal switch 35 is now open, the transmit potential in line 38 will no longer be present and the lockout control unit 25 is then operated to de-energize the transmitter 22 and energize the receiver 21, thus releasing the power line 10 for use by other stations in the communication system.

Referring now to Fig. 2 of the drawings, the specific details of one form of lockout control unit circuit will now be described. In order to supply a source of regulated direct current voltage for operation of the basic timing circuit of the lockout control circuit, a transformer 90 is connected to a full wave rectifying circuit 91 and a filter circuit including the resistor 92 and condensers 93 and 94. A voltage regulator tube of the gaseous discharge type is shown at 95 to regulate the voltage appearing across the condenser 94, and the voltage divider resistor 97. In such manner, a regulated voltage source of 150 volts potential of negative polarity is provided at point 100 for connection by line 101 through current limiting resistor 102 to the carrier presence relay switch contacts 103.

Carrier presence relay coil 104 is connected to be energized by the signal in lines 26 and 27 from the receiver 21 so that when a carrier signal is received from the power line 10 by the receiver 21, the coil 104 will be energized to close the switch contacts 103 and apply the regulated voltage of negative polarity through the current limiting resistor 105 to the control grid of the relay triode tube 106. The relay triode tube 106 is connected to be normally conductive, but is cut off when the negative voltage is connected to its control grid upon the closing of the carrier presence relay switch contacts 103.

The relay coil 110 is normally energized when the relay triode 106 conducts and its switch contacts 111 and 112 are normally in the solid line position as shown. However, when a carrier signal is received by the receiver 21 and the switch contacts 103 are closed to cut off the relay triode 106, the relay coil 110 is de-energized to move the switch contacts 111 and 112 to the dotted line position, and energize the light 113 which indicates that a carrier is present on the power line 10. The movement of the switch contacts 112 to the dotted line position prevents the energization of the relay coil 115 or the relay coil 116, either one of which must be energized in order to energize the transmitter 22 and de-energize the receiver 21 in the manner to be later described in detail.

Now when the transmit signal relay 60 has been energized, contacts 35 thereof are closed and the B+ potential from terminal 61 is applied through line 65 and current limiting resistor 66 to provide a transmit potential at the terminal point 70 of the lockout control circuit. The relay coil 115 will therefore be energized through line 117 and switch contact 112 to chassis ground, in the event that the relay 110 is energized and a carrier signal is not received by the receiver 21. Prior to the energization of the relay 115, the relay switch contacts 120 were in the dotted line position shown, to charge the condenser 121 through the current limiting resistor 122 from the regulated negative voltage at the point 100. When the transmit signal at point 70 energizes the relay coil 115, the relay switch contacts 120 move to the solid line position to discharge the condenser 121 through the adjustable time constant determining resistor 124 connected thereacross. While the condenser 121 is discharging, the negative voltage thereacross is also connected through the current limiting resistor 125 to the control grid of the triode tube 126 to make such tube less conductive and raise the potential at its plate electrode 127 to apply a more positive voltage through the current limiting resistor 128 to the control grid of the relay triode tube 129.

For the short period of time that condenser 121 is discharging through resistor 124, the relay triode tube 129 is made more conductive to energize the relay coil 130 and move relay switch contacts 131—133 to the dotted line positions. The dotted line position of switch contacts 131 deenergizes the receiver 121 by disconnecting lines 43 and 44 which are connected through the normally closed switch contacts 140 and line 141, and energizes the transmitter 22 by connecting line 42 with line 43. At the same time the dotted line position of switch contact 132 establishes a circuit from the test transmission coding device 45 of line 46 to the transmitter 22 to code the test transmission of the transmitter. Switch contact 133 in the dotted line position establishes a circuit between lines 143 and 144 to charge condenser 145 with positive polarity direct current from the B+ terminal 146. It is to be noted that the positive charges on condenser 145 will be discharged through line 147 and current limiting resistor 148 when the switch contact 112 of relay 110 is moved to the dotted line position in response to the reception of a carrier signal by the receiver 21.

The resistor 124 is adjusted to provide a time constant for discharging the condenser 121 adjustable through a range of .3 second to about 3.6 seconds (for example). Thus by adjusting the resistor 124 for each lockout control circuit of each automatic unattended remote station to a different time interval, the transmitter 22 of each remote station will be preliminarily energized with its carrier frequency coded for a different length of time to thus provide identification for each different remote station.

After the condenser 121 is completely discharged, the triode tube 126 again returns to normal conductivity and the triode tube 129 becomes less conductive to de-energize the relay coil 130 and return relay switch contacts 131—133 to the normal solid line positions as shown.

After the relay coil 130 is de-energized at the end of the preliminary transmission period, and the switch contact 133 returns to the solid line position, the positive charge across condenser 145 is connected through an adjustable time delay resisistor 150 to the control grid of relay triode tube 151. The values of the time delay resistor 150 and condenser 152 are selected to delay the application of the positive voltage from condenser 145 to the control grid of the relay triode tube 151 until after a time period of about 1/10 of a second, which is thus determined to be the listen time interval during which the receiver 21 is energized and the transmitter 22 is de-energized by the connection of switch contact 131 in the normal solid line position. If at any time during the listen time interval when the charge of condenser 145 is being connected through the time delay resistor 150 to be applied to the control grid of relay tube 151, a carrier signal is received to energize the carrier presence relay 104 and de-energize relay 110, the positive charge across condenser 145 is immediately connected to ground through switch contacts 112 in the dotted line position thus preventing the subsequent conduction of relay triode 151 and the energization of relay coil 116.

If at the end of the listen time interval no other carrier signal is received by the receiver 21, the positive voltage appearing across the condenser 145 is connected to the control grid of relay triode 151 to make such tube conductive and energize relay 116, moving switch contacts 180, 140, 153 and 154, to the dotted line positions. The positive voltage across condenser 145 is completely discharged through the bleeder resistance 155 and switch contact 180 so that relay tube 151 is made conductive only for a short period of time sufficient to initially energize the relay coil 116. The movement of the switch contacts 153 to the dotted line position by the initial energization of the relay coil 116, establishes a holding circuit for the relay coil 116 through line 160 from point 70 so long as the transmit signal from the B+ terminal 61 is connected through switch contacts 35 to point 70.

The movement of the switch contact 140 to the dotted line position de-energizes the receiver 21 and energizes the transmitter 22, while the movement of the switch contact 180 to the dotted line position interrupts the circuit in line 79 to the signal control unit holding circuit, so that this control unit will operate to transmit the various signals or information to line 84, and the transmitter 22. When the chassis ground is removed from line 79, the coding device connects a duplicate transmit potential to point 70 through line 75 and current limiting resistor 76. This transmit potential maintains the energization of relay coils 115 and 116 when the signal control unit de-energizes relay coil 60, breaking the initiating transmit signal through switch contacts 35, during the transmission of supervisory information. Relay coil 60 serves as a memory for a specific piece of information, and while this information is being transmitted, relay coil 60 is released.

The movement of the switch contacts 154 of relay 116 to the dotted line position disconnects the relay coil 130 from chassis ground so as to assure that such relay coil will not be inadvertently operated during the normal transmission by the transmitter 22. Signals from the signal control unit 39 will be continuously applied to the transmitter 22 until all signals desired to be sent by this station have been transmitted. Signals from the various units (1–4 illustrated) are applied through conductors 51–54 to the signal control unit 39 and may be transmitted therefrom in a predetermined sequence as may be desired. When all signals are transmitted from the unit 39, circuit to line 75 is broken, removing the transmit potential from point 70 and line 160, thus de-energizing the relay coil 116 and moving switch contacts 180, 140, 153 and 154 to their normal solid line positions, as shown. Such subsequent de-energization of the relay coil 116 again energizes the receiver 21 and de-energizes the transmitter 22 to return the lockout control circuit to the normal condition and release the power line 10 for use by other stations in the system.

As will be further explained, it is necessary to provide a delay after a signal is received at a station before a test or other transmission is initiated. To accomplish this, a condenser 225 is connected in series with the resistor 105 to the control grid of the carrier presence relay tube 106. The condenser 225 is of such capacity as to maintain the negative voltage on the control grid of the relay tube 106 for a predetermined period of time after the carrier presence relay switch 103 is opened when a carrier signal is no longer received by the station receiver. The period of time for discharging the condenser 225 is selected to be greater than the period of time previously referred to as the listen interval during which condenser 145 is being discharged through the time delay resistor 150 to the control grid of triode 151 for energizing the relay 116. In other words, no station in the system may become operative to energize its transmitter until after a predetermined period of time following the de-energization of another station transmitter which period of time is greater than the listening period, as established by time constant resistor 150.

Referring now to Fig. 3, an example of the typical operation of the lockout control circuit of the invention will now be described. The curve 175 generally indicates the condition of operation of remote station 12, curve 176 generally indicates the condition of operation of remote station 13, and curve 177 generally indicates the operative condition of attended station 11, with respect to the passage of time. In these curves, the portion above the base line indicates transmission, and the portion below the base line indicates reception. The dotted portion indicates coded transmission and reception, and the light curved lines indicate the delay following a received signal before either test or regular transmission can take place.

At the point 180 in time, both of the remote stations 12 and 13 desire to transmit and the transmit signal relay 60 of each of such stations is energized to operate the lockout control circuit as previously described. This causes the preliminary energization of the transmitters of these stations for the predetermined identifying time period which may be termed the query periods, being shown at 183 and 184 for remote stations 12 and 13, respectively. The receiver of the attended terminal station 11 is energized and its transmitter is de-energized so that a listen period indicated at 181 is established. Remote station 12 has the longer preliminary transmission query period with respect to remote station 13, so that at the point in time 185, the remote station 13 is now in the listen condition with its receiver energized and its transmitter de-energized. At the same time the remote station 12 is still transmitting so that the receiver of the remote station 13 receives the carrier of the remote station 12 and its lockout control unit 25 operates to prevent the final energization of its final transmission relay coil 116 (Fig. 2). At the point in time 186, remote station 12 reaches the end of its preliminary transmission time period and its transmitter is de-energized and receiver energized.

The attended station 11 may also include a receiver carrier presence relay which prevents any transmission during the interval from 180 to 186, and a device responsive to the coded test query transmissions 183 and 184 to mute the receiver output so that spurious signals produced by more than one carrier will have no effect upon the other responsive circuits. Therefore, at the time 186, all receivers in the system are now energized to listen for carrier signals of other transmitters.

The delay after a carrier is received, caused by the discharging of condenser 225, is indicated by the light line curves 187 and 188. The transmitters of remote station 13 and of attended station 11 cannot become energized during the listen interval of remote station 12. Station 12 has been given a priority to use the power line 10 in view of the fact that its preliminary transmission query period 183 is the longer. At the end of the listen period as indicated at the time 189, the transmitter of station 12 is again energized for transmitting information, and this holds the stations 13 and 11 locked out. When the time 190 is reached and the transmission of station 12 may be completed, the lockout control will again energize its receiver and deenergize its transmitter.

After the transmission from station 12 is completed, the condenser 225 of remote station 13 again begins to discharge, and if no other carrier signal is heard during the delay time, the transmitter of station 13 becomes energized at the time 191 to again send out a preliminary identifying transmission query 192. Following this, the remote station 13 again has a listen period **192*a* and if no other carrier signal is heard, the transmitter of remote station 13 is finally energized at the time 193 for transmitting information. At the time 194, for example, the transmission by remote station 13** may be completed and its receiver is again energized and transmitter de-energized to return to the normal listening state.

After the transmission from station 13 the attended station 11 may desire to transmit. It may start at time 195, since the delay has been completed as shown by curve 188. From time 195 to time 196, neither of the remote stations 12 or 13 may become operative to transmit a query in view of the energization of their carrier presence relays 104 by the transmission from station 11, and the consequent de-energization of relay coils 110 in their lockout control units. After time 196, however, if the remote station 12 again desires to transmit, the condenser 225 is discharged to complete the delay time, as indicated by the curve 197, following which the preliminary transmission query period 198 may be established and the remaining operation is as previously described.

As previously indicated, the system could be arranged to operate on varying listen times as well as varying test transmission times. The station with the shortest listen time would then have priority as it would start the main transmission first and thereby cut off the station having a longer listen time.

It should be apparent from the preceding description that the lockout control circuit of the invention enables a remote unattended station of the power line carrier communication system to establish a priority for transmitting over the carrier power line, in the event that two stations simultaneously desire to transmit. In such case the remote station with the longest identifying preliminary transmission period or query is selected as the station for obtaining priority to the power line. The system of the invention also operates to prevent the energization of any transmitter in the system in the event that another transmitter in the system is already energized and a carrier signal is present on the power line.

Various modifications may be made within the spirit of the invention and it is desired to cover all such modifications which fall within the scope of the appended claims.

We claim:

1. In a carrier wave communication system of the type having a plurality of stations, each of which includes a transmitter and a receiver operating on the same carrier frequency with the receiver normally energized and the transmitter normally de-energized, and including means operating automatically in response to a signal to be transmitted, the lockout control system whereby simultaneous transmission of signals by two or more transmitters is prevented including a unit at each station having in combination, first means adapted to be energized in response to a signal to be transmitted to preliminarily energize the transmitter and de-energize the receiver of the station, said first means at the various stations in the system including means providing energization thereof for different lengths of time, second means adapted to be energized in response to the de-energization of said first means and operating after a predetermined time delay interval to energize the transmitter and de-energize the receiver of the station for transmitting the signal therefrom, and third means responsive to the reception of a carrier signal by the receiver of the station for disabling the energization of said first and second means and thereby preventing the energization of the transmitter of the station.

2. In a carrier wave communication system of the type having a plurality of stations, each of which includes a transmitter and a receiver operating on the same carrier frequency with the receiver normally energized and the transmitter normally de-energized, and including means operating automatically in response to a signal to be transmitted, the lockout control system whereby simultaneous transmission of signals by two or more transmitters is prevented including a unit at each station having in combination, first means adapted to be energized in response to a signal to be transmitted to preliminarily energize the transmitter and de-energize the receiver of the station for a first predetermined time interval, second means adapted to be energized in response to the de-energization of said first means and operating after a second predetermined time delay interval to energize the transmitter and de-energize the receiver of the station for transmitting the signal therefrom, and third means responsive to the reception of a carrier signal by the receiver of the station for disabling the energization of said first and second means and thereby preventing the energization of the transmitter of the station, said units at the various stations being adjusted so that one of said first and second predetermined time delay intervals differs with each station and one of said stations is thereby preferred in the event of simultaneous energization of two or more transmitters by signals thereat.

3. In a carrier wave communication system of the type having a plurality of stations, each of which includes a transmitter and a receiver operating on the same carrier frequency with the receiver normally energized and the transmitter normally de-energized, and including means operating automatically in response to a signal to be transmitted, the lockout control system whereby simultaneous transmission of signals by two or more transmitters is prevented including a unit at each station having in combination, first means adapted to be energized in response to a signal to be transmitted to preliminarily energize the transmitter and de-energize the receiver of the station, said first means at the various stations in the system including means providing energization thereof for different lengths of time, second means adapted to be energized in response to the de-energization of said first means and operating after a predetermined time delay interval to energize the transmitter and de-energize the receiver of the station for transmitting the signals therefrom, and third means responsive to the reception of a carrier signal by the receiver of the station for disabling said first and second means to thereby prevent the energization of the transmitter of the station, said third means including time delay means effective to continue to hold said first and second means disabled for an interval of time after a carrier signal has been received which is greater than said predetermined time delay interval.

4. In a carrier wave communication system of the type having a plurality of stations, each of which includes a transmitter and a receiver operating on the same carrier frequency with the receiver normally energized and the transmitter normally de-energized, and including means operating automatically in response to a signal to be transmitted, the lockout control system whereby simultaneous energization of two or more transmitters to transmit is prevented including a unit at each station having in combination, first means adapted to be energized in response to a signal to be transmitted to preliminarily energize the transmitter and deenergize the receiver of the station for a given time interval, second means adapted to be energized in response to the deenergization of said first means and operating after a predetermined time delay interval to energize the transmitter and de-energize the receiver of the station for transmitting the signal therefrom, one of said first and second means at the various stations in the system including means providing time intervals which differ for each station, and third means responsive to the reception of a carrier signal by the receiver of the station for disabling said first and second means to thereby prevent the energization of the transmitter of the station, said third means including time delay means effective to continue to hold said first and second means disabled for an interval of time after a carrier signal has been received which is greater than said predetermined time delay interval of said second means.

5. In a carrier wave communication system of the type having a plurality of stations, each of which includes a frequency-modulated transmitter and receiver operating on the same carrier frequency with the receiver normally energized and the transmitter normally de-energized, and including means operating automatically in response to a signal to be transmitted, the lockout control system whereby simultaneous transmission of signals by two or more transmitters is prevented including a unit at each station having in combination, first means adapted to be energized in response to a signal to be transmitted to preliminarily energize the transmitter and to code the transmission thereof and to de-energize the receiver of the station, said first means at the various stations in the system including means providing energization thereof for different lengths of time, second means adapted to be energized in response to the deenergization of said first means and operating after a predetermined time delay interval to energize the transmitter and de-energize the receiver of the station for transmitting the signal therefrom, third means responsive to the reception of a carrier signal by the receiver of the station for preventing the energization of said first and second means and thereby preventing the energization of the transmitter of the station, and means coupled to the receiver rendered operative in response to a received coded transmission to indicate the preliminary energization of a transmitter in the communication system.

6. In a carrier wave communication system of the type having a plurality of stations, each station including a transmitter and a receiver normally tuned to the same carrier frequency, with the receivers normally energized and the transmitters normally de-energized, the system operation being such that the transmitters of at least two stations may be simultaneously energized and their receivers deenergized to transmit resulting in interference by the simultaneous transmission over the same carrier frequency, the lockout control system for each station whereby simultaneous transmission of signals by two or more transmitters is prevented including in combination, first means adapted to be energized in response to a transmitting signal to preliminarily energize the transmitter and de-energize the receiver of the station desiring to transmit, said first means at each station in the system including a time delay circuit that may be adjusted to subsequently de-energize said first means after a different length of energization time with respect to the energization times of the first means of all other stations in the system, second means adapted to be energized in response to subsequent de-energization of said first means and operating after a predetermined time delay interval to energize the transmitter and de-energize the receiver of the station desiring to transmit, said second means acting during said predetermined time delay interval to de-energize the transmitter and energize the receiver of the station desiring to transmit to provide a listening interval, and third means responsive to the reception of a carrier signal by the receiver of the station desiring to transmit to prevent the energization of either said first or second means and thereby the energization of the transmitter and de-energization of the receiver.

7. In a carrier wave communication system of the type having a plurality of stations, each station including a transmitter and a receiver normally tuned to the same carrier frequency, with the receivers normally energized and the transmitters normally de-energized, the basic system operation being such that the transmitters of at least two stations may be simultaneously energized and their receivers de-energized to transmit resulting in interference by the simultaneous transmission over the same carrier frequency, the lockout control system for each station whereby the simultaneous transmission of signals by two or more transmitters is prevented including in combination, first means responsive to a transmitting signal to preliminarily energize the transmitter and de-energize the receiver of the station desiring to transmit for a first time interval to query the system, second means operating in response to the completion of the operation of said first means to energize the receiver and de-energize the transmitter during a second time interval forming a listening interval and to thereafter energize the transmitter and de-energize the receiver, one of said first and second time intervals being different for each station in the system, and third means responsive to the reception of a carrier signal by the receiver of the station desiring to transmit to prevent the energization of the transmitter and de-energization of the receiver by either of said first or second means.

8. In a radio frequency communication system of the type having a plurality of stations, each station including a transmitter and a receiver normally tuned to the same carrier frequency, with the receivers normally energized and the transmitters normally de-energized, the basic system operation being such that the transmitters of at least two stations may be simultaneously energized and their receivers de-energized to transmit resulting in interference by the simultaneous transmission over the same carrier frequency, the lockout control system for each station whereby the simultaneous transmission of signals by two or more transmitters is prevented including in combination, first means responsive to a transmitting signal to preliminarily energize the transmitter and de-energize the receiver of the station desiring to transmit, said first means at each station in the system being operative to preliminarily energize the transmitter for a different length of time with respect to the preliminary energization times of all other station transmitters in the system, second means operated in response to the transmitting signal and acting after a predetermined time interval following the completion of the operation of said first means to energize the transmitter and de-energize the receiver of the station desiring to transmit, said second means being adapted to energize the receiver and de-energize the transmitter during said predetermined time interval which forms a listening period, and third means responsive to the reception of a carrier signal by the receiver of the station desiring to transmit to prevent the energization of the transmitter and de-energization of the receiver by either of said first or second means.

9. In a radio frequency communication system of the type having a plurality of stations, each station including a transmitter and a receiver normally tuned to the same carrier frequency, with the receivers normally energized and the transmittters normally de-energized, the basic system operation being such that the transmitters of at least two stations may be simulaneously energized and their receivers de-energized to transmit resulting in interference by the simultaneous transmission over the same carrier frequency, the lockout control system for each station whereby the simultaneous transmission of signals by two or more transmitters is prevented including in combination, first means responsive to a transmitting signal to preliminarily energize the transmitter and de-energize the receiver of the station desiring to transmit for a first time interval, second means operated in response to the transmitting signal and acting after a second time interval following the completion of the operation of said first means to energize the transmitter and de-energize the receiver of the station desiring to transmit, said second means being adapted to energize the receiver and de-energize the transmitter during said second time interval to form a listening period, one of said first and second means being adjusted so that the time interval thereof differs for each station in the system, and third means adapted to be energized in response to the reception of a carrier signal by the receiver of the station desiring to transmit to prevent the energization of the transmitter and de-energization of the receiver by either of said first or second means, said third means including time delay means to prevent its subsequent de-energization until after a carrier signal is received for a period of time greater than said second time interval of said second means.

10. In a carrier wave communication system of the type having a plurality of stations, each station including a transmitter and a receiver normally tuned to the same carrier frequency, with the receivers normally energized and the transmitters normally de-energized, the system operation being such that the receivers of at least two stations may be simultaneously de-energized and the transmitters thereof energized to transmit resulting in interference by the simultaneous transmission over the same carrier frequency, the lockout control system for each station whereby simultaneous transmission of signals by two or more transmitters is prevented including in combination, first relay means adapted to be energized in response to a transmitting signal to preliminarily energize the transmitter and de-energize the receiver of the station desiring to transmit, said first relay means at each station in the system being energized and subsequently de-energized for a different length of energization time with respect to the energization times of the first means of all other stations in the system, second relay means adapted when energized to energize the transmittter and de-energize the receiver of the station desiring to transmit and when deenergized to de-energize said transmitter and energize said receiver, a condenser, said first relay means being adapted when energized to charge said condenser, and including means for connecting said condenser to said second relay means for energizing the same after a predetermined time delay interval when said first relay means is de-energized, and third relay means adapted to be energized when a carrier signal is received by the receiver of the station desiring to transmit to prevent the energization of either of said first or second relay means, said third relay means including means for discharging said condenser upon energization thereof.

11. In a radio frequency communication system of the type having a plurality of stations, each station including a transmitter and a receiver normally tuned to the same carrier frequency, with the receivers normally energized and the transmitters normally de-energized, the system operation being such that the receivers of at least two stations may be simultaneously de-energized and the transmitters thereof energized to transmit resulting in interference by the simultaneous transmission over the same carrier frequency, the lockout control system for each station whereby simultaneous transmission of signals by two or more transmitters is prevented including in combination, first relay means adapted to be energized in response to a transmitting signal to preliminarily energize the transmitter and de-energize the receiver of the station desiring to transmit, said first relay means at each station in the system being energized and subsequently de-energized for a different length of energization time with respect to the energization times of the first means of all other stations in the system, second relay means adapted when energized to energize the transmitter and de-energize the receiver of the station desiring to transmit, said second relay means being adapted to de-energize said transmitter and energize said receiver when said second relay means is de-energized to provide a listening period, a condenser, said first relay means being adapted when energized to charge said condenser and including means connecting said condenser to said second relay means to energize the same after a predetermined time delay interval when said first relay means responsive is de-energized, means to said transmitting signal to maintain the energization of said second relay means after said condenser is discharged, and third relay means adapted to be energized when a carrier signal is received by the receiver of the station desiring to transmit to prevent the energization of either of said first or second relay means.

12. In a carrier wave communication system of the type having a plurality of stations, each station including a transmitter and a receiver normally tuned to the same carrier frequency, with the receivers normally energized and the transmitters normally de-energized, the system operation being such that the receivers of at least two stations may be simultaneously de-energized and the transmitters thereof energized to transmit resulting in interference by the simultaneous transmission over the same carrier frequency, the lockout control system for each station whereby simultaneous transmission of signals by two or more transmitters is prevented including in combination, first means adapted to be energized in response to a transmitting signal to preliminarily energize the transmitter and de-energize the receiver of the station desiring to transmit, said first means at each station in the system being energized and subsequently de-energized for a different length of energization time with respect to the energization times of the first means of all other stations in the system, means operated by said first means when energized to code the wave from the station transmitter, second means adapted to be energized in response to the subsequent de-energization of said first means and operating after a predetermined time delay interval to energize the transmitter and de-energize the receiver of the station desiring to transmit, said second means in the de-energized condition during the time delay interval being adapted to de-energize the transmitter and energize the receiver of the station desiring to transmit to provide a listening period, and third means responsive to the reception of a carrier signal by the receiver of the station desiring to transmit to prevent the energization of either said first or second means and thereby the energization of the transmitter and de-energization of the receiver.

13. In a carrier wave communication system of the type having a plurality of stations, each station including a transmitter and a receiver normally tuned to the same carrier frequency, with the receivers normally energized and the transmitters normally de-energized, the system operation being such that the receivers of at least two stations may be simultaneously de-energized and the transmitters thereof energized to transmit resulting in interference by the simultaneous transmission over the same carrier frequency, the lockout control system for each station whereby simultaneous transmission of signals by two or more transmitters is prevented including in combination, first means adapted to be energized in response to a transmitting signal to preliminarily energize the transmitter and de-energize the receiver of the station desiring to transmit for a first interval of time, means operated by said first means when energized to code the wave from the station transmitter, second means adapted to be energized in response to the subsequent de-energization of said first means and operating after a second interval of time to energize the transmitter and de-energize the receiver of the station desiring to transmit, said second means in the de-energized condition during the second time interval being adapted to de-energize the transmitter and energize the receiver of the station desiring to transmit to provide a listening period, one of said first and second means being so adjusted that the time interval thereof is different for each of the stations, means associated with each receiver to render a portion thereof inoperative in response to the reception of a coded wave thereby, and third means responsive to the reception of a carrier signal by the receiver of the station desiring to transmit to prevent the energization of either said first or second means and thereby the energization of the transmitter and de-energization of the receiver.

14. In a radio frequency communication system of the type having a plurality of stations, each station including a transmitter and a receiver normally tuned to the same carrier frequency, with the receivers normally energized and the transmitters normally de-energized, the system operation being such that the transmitters of at least two stations may be simultaneously energized and their receivers de-energized to transmit resulting in interference by the simultaneous transmission over the same carrier frequency, the lockout control system for each station whereby simultaneous transmission of signals by two or more transmitters is prevented including in combination, first means adapted to be energized in response to a transmitting signal to preliminarily energize the transmitter and de-energize the receiver of the station desiring to transmit for a first time interval of time, means operated by said first means when energized to code the wave from the station transmitter, second means adapted to be energized in response to the subsequent de-energization of said first means and operating after a second time interval to energize the transmitter and de-energize the receiver of the station desiring to transmit, said second means in the de-energized condition during the second time interval being adapted to de-energize the transmitter and energize the receiver of the station desiring to transmit to provide a listening period, said first and second means being so adjusted that one of said first and second time intervals is different for each of the stations, and means coupled to each receiver responsive to the reception of a coded wave thereby for disabling a part of the receiver.

References Cited in the file of this patent

UNITED STATES PATENTS

| | | |
|---|---|---|
| 1,771,234 | Remington | July 22, 1930 |
| 1,844,648 | Farley et al. | Feb. 9, 1932 |
| 2,059,204 | Boswau | Nov. 3, 1936 |
| 2,273,383 | Snavely et al. | Feb. 17, 1942 |
| 2,289,517 | Muehter | July 14, 1942 |